Patented Feb. 26, 1935

1,992,481

UNITED STATES PATENT OFFICE 1,992,481

MANUFACTURE OF ALKALI METAL SALTS OF NAPHTHALENE-1-SULPHONIC ACID

Armin Hasler, Richard Meyer, and Josef Schäfer, Basel, Switzerland, assignors to the Swiss firm J. R. Geigy S. A., Basel, Switzerland No Drawing. Application December 14, 1933, Serial No. 702,422. In Germany December 22, 1932

2 Claims. (Cl. 260—159)

There has not hitherto been known a simple commercially applicable process for the production of alkali metal salts of pure naphthalene-1-sulphonic acid. If it is attempted to sulphonate naphthalene in known manner with sulphuric acid so that the sulphonic acid group enters the 1-position to as great an extent as possible, there is always produced a mixture of naphthalene-1- and naphthalene-2-sulphonic acid, such as for instance, at 20–65° C., according to the determinations of the present applicants, besides 85–90 per cent of naphthalene-1-sulphonic acid also 10–15 per cent of naphthalene-2-sulphonic acid. This is a substantially higher proportion of the latter acid than is indicated by Euwes in Recueil des travaux chimiques des Pays Bas, Vol. 28, page 298 (1909).

The separation of the acids by way of their salts, which alone comes into practical consideration, is very incomplete, as was indicated by Witt as recently as 1915 (Berichte der deutschen chemischen Gesellschaft, Vol. 48, page 748), quite apart from the further objection that the aqueous solutions of the calcium salts of both sulphonic acids have a very high capacity for dissolving calcium sulphate, so that the latter constitutes a third calcium salt in the mixture of salts which has to be separated by fractional crystallization. In the last named publication it is said of the lead and barium salts that it is uncommonly difficult to separate in a practicable manner the two isomers in the form of these salts.

The manufacture of free naphthalene-1-sulphonic acid by the method of Fierz (Helvetica chimica acta, Vol. 3, page 312 (1920), is not suited as a technical process owing to the losses occasioned by its high solubility and the complications associated with its operation on the commercial scale.

The present invention takes advantage of the sparing solubility of the ferrous salt of naphthalene-2-sulphonic acid for freeing naphthalene-1-sulphonic acid from the admixed isomeric 2-sulphonic acid. A process for making salts of pure naphthalene-2-sulphonic acid which is based on this property is indeed already described in British Specification No. 4459 of 1894, but the said specification contains no indication that such a method of separation would be suitable also for separating pure naphthalene-1-sulphonic acid from a small quantity of naphthalene-2-sulphonic acid present as a by-product in the sulphonation product obtainable at temperatures up to 100° C. and containing the naphthalene-1-sulphonic acid as the main product.

Among the later investigators of the two naphthalene-mono-sulphonic acids, even Ephraim (Helvetica chimica acta, Vol. 8, pages 233 and 726 (1925)), who made use of the sparingly soluble ferrous naphthalene-2-sulphonate only for the preparation of pure naphthalene-2-sulphonic acid, did not conceive the idea of making also pure naphthalene-1-sulphonic acid with the aid of this reaction, for apparently he proceeded according to the method of Fierz, (loc. cit.).

It was indeed questionable whether the new problem, namely the quantitative production of pure naphthalene-1-sulphonates free from isomer, could be solved in a commercially unobjectionable manner by the application of the separation process of British Specification No. 4459 of 1894. For it is known that the naphthalene sulphonic acids themselves influence in a high degree the solubility relationships of similar compounds. Witt indeed refers frequently to this fact in his paper cited above. It therefore could not be foreseen whether the ferrous salt of naphthalene-2-sulphonic acid would precipitate sufficiently quantitatively from a mixture of a small quantity of the 2-sulphonic acid and a large excess of the isomeric 1-sulphonic acid in such a manner as to leave practically pure naphthalene-1-sulphonic acid in solution.

It has been found that the action of naphthalene-1-sulphonic acid in increasing the solubility of the ferrous salt of naphthalene-2-sulphonic acid is reduced in the presence of sulphuric acid and that naphthalene-2-sulphonic acid can be precipitated so completely as the ferrous salt from a solution containing more than 10 per cent of sulphuric acid, that alkali metal salts of pure naphthalene-1-sulphonic acid can be recovered practically quantitatively from the filtrate. Thus the invention provides a means of preparing practically pure naphthalene-1-sulphonic acid in the form of its salts in a very simple manner. Naphthalene-1-sulphonic acid is only of great commercial value when it is easily accessible in a form free from the isomeric 2-sulphonic acid, which was not hitherto the case.

Notwithstanding the statements in British Specification No. 4459 of 1894 no step towards the solution of the new problem has been taken either in scientific literature or in industry, although the substance concerned is a simple intermediate product which has been known from the beginning of industrial organic chemistry.

The following example illustrates the invention, the parts being by weight unless otherwise stated and the relationship between parts by weight and parts by volume being that which exists between a kilogram and a liter:—

The reaction product resulting from the sulphonation of 256 parts of naphthalene by means of sulphuric acid monohydrate at 60° C. and consisting of 355–360 parts of naphthalene-1-sulphonic acid, 50–55 parts of naphthalene-2-sulphonic acid and 320 parts of excess sulphuric acid, is dissolved in water. The naphthalene-2-sulphonic acid is then converted into its sparingly soluble ferrous salt by the addition of a solution of 44 parts of ferrous sulphate, $FeSO_4 + 7H_2O$, (= the theoretical quantity + an excess of 25 per cent), the quantity of water being such that the total volume amounts to 2000 parts by volume. After the whole has been allowed to stand for about 15 hours the ferrous salt which has precipitated is separated by filtration at 5–20° C. and an alkali metal salt of naphthalene-1-sulphonic acid is obtained from the filtrate by salting out. The yield amounts to about 90 per cent of the naphthalene-1-sulphonic acid present in the sulphonation mixture and the product contains at the most 0.5–1 per cent of naphthalene-2-sulphonic acid.

If the naphthalene-1-sulphonate were salted out without previous separation of the naphthalene-2-sulphonic acid in the form of its ferrous salt, there would be obtained a product containing at least 10 per cent of naphthalene-2-sulphonic acid.

What we claim is:—

1. A manufacture of alkali salts of substantially pure naphthalene-1-sulphonic acid, consisting in preparing a sulphonation mixture by the action of an excess of sulphuric acid on naphthalene at temperatures usual for the production of naphthalene-1-sulphonic acid, diluting the mixture in suitable manner with water, adding an iron salt thereto to recover the admixed naphthalene-2-sulphonic acid in the form of its ferrous salt, separating same by filtration and salting out the filtrate to obtain therefrom the naphthalene-1-sulphonic acid in the form of alkali metal salt.

2. A manufacture of alkali salts of substantially pure naphthalene-1-sulphonic acid, consisting in preparing a sulphonation mixture by the action of an excess of sulphuric acid on naphthalene at temperatures usual for the production of naphthalene-1-sulphonic acid, diluting the mixture in suitable manner with water, adding ferrous sulphate thereto to recover the admixed naphthalene-2-sulphonic acid in the form of its ferrous salt, separating same by filtration and salting out the filtrate to obtain therefrom the naphthalene-1-sulphonic acid in the form of alkali metal salt.

ARMIN HASLER.
RICHARD MEYER.
JOSEF SCHÄFER.